Dec. 27, 1966  R. C. DELLERT ET AL  3,294,926
MOTOR CONTROL SWITCH WITH IMPROVED OPERATOR AND
OVER CENTER RESILIENT MEANS
Filed Aug. 3, 1965  4 Sheets-Sheet 1

INVENTORS
ROBERT C. DELLERT,
CYRIL O. FINNEGAN
BY David M. Schiller
ATTORNEY

INVENTORS
ROBERT C. DELLERT,
CYRIL O. FINNEGAN

BY David M. Schiller
ATTORNEY

Dec. 27, 1966 R. C. DELLERT ET AL 3,294,926
MOTOR CONTROL SWITCH WITH IMPROVED OPERATOR AND
OVER CENTER RESILIENT MEANS
Filed Aug. 3, 1965 4 Sheets-Sheet 3

INVENTORS
ROBERT C. DELLERT,
CYRIL O. FINNEGAN
BY David M. Schiller
ATTORNEY

U̇nited States Patent Office    3,294,926
Patented Dec. 27, 1966

1

3,294,926
MOTOR CONTROL SWITCH WITH IMPROVED
OPERATOR AND OVER CENTER RESILIENT
MEANS
Robert C. Dellert, Bloomington, and Cyril O. Finnegan,
Normal, Ill., assignors to General Electric Company, a
corporation of New York
Filed Aug. 3, 1965, Ser. No. 476,803
15 Claims. (Cl. 200—5)

This invention relates to electric switches and particularly to manually operable two and three pushbutton switches for controlling electric motors.

Switches of the type employed for controlling operation of motors must be capable of controlling a variety of operations such as motor starting, stopping, speed and direction. In installations wherein it is desired merely to start and stop a motor a two button switch is generally provided. In installations wherein it is additionally desired to control the speed or direction of a motor, three button switches are ordinarily provided. The functional requirements of three button motor control switches differ substantially depending upon whether the switch is applied to control motor speed or direction.

Three button reversing switches which are utilized to control the direction of a motor generally have a "stop" button and a pair of direction control buttons. In switches for this purpose it is necessary that suitable lock means be provided to prevent actuation of one of the direction control buttons while the other direction control button is in an actuated position thus requiring the intermediate step of actuating the "stop" button. Three button switches which are utilized to control motor speed generally have a "stop" button and a pair of speed control buttons. In such switches a lock of the type abovedescribed is not necessary and instead provision is made to permit actuation of either of the speed control buttons without first actuating the "stop" button. However, in his type of switch it is necessary to make provision for assuring that both of the speed control buttons cannot be in their actuated positions simultaneously.

Although two and three button switches having the above functional requirements have been previously provided, they generally have been of costly and bulky design including operating mechanisms of intricate multipart construction which are difficult and expensive to replace and repair. Moreover, because of the different functional requirements of the three switch types abovedescribed, it has been the practice for a manufacturer to specially design each type of switch so that it includes its own special parts which are not interchangeable in the three switch types. This complicates the stocking of switch parts and contributes to the high cost of such switches.

It is therefore a primary object of the invention to provide novel and improved electric switches incorporating a minimum number of inexpensive components which are usable interchangeably in switches having different functional requirements.

It is another object of the invention to provide novel and improved motor control switches incorporating modular basic components which are usable interchangeably in two and three button switch designs.

It is a further object of the invention to provide novel and improved motor control switch constructions incorporating modular basic components usable interchangeably in three button motor speed control switches or three button motor reversing switches.

It is a still further object of the invention to provide novel and improved means for compactly housing various parts of a pushbutton type switch.

It is still another object of the invention to provide an over-center spring type pushbutton switch having novel and improved means for forcibly moving the movable contacts to open position in response to actuation of the switch in the event the contacts are not opened by movement of the over-center spring.

In carrying out the invention in one form, a switch construction is provided for controlling motors and includes basic modular components which are usable interchangeably in both two and three pushbutton switch designs. A two button switch design according to the invention includes a housing having a case and a cover closing the case. A mounting plate underlies the cover and supports a recessed housing section module within the case. A contact block module incorporating a movable contact carrier and cooperating fixed contacts underlies the housing section, and an improved operating mechanism module is connected between the contact carrier and the two pushbuttons which are within openings of the cover. The operating mechanism includes an operator connected to the contact carrier and mounted by the housing section for movement in response to movement of a lever which has its ends connected respectively to the pushbuttons by pin and slot connections and which is guided by means in the housing section for movement relative to the operator in response to actuation of either pushbutton. An over-center spring is mounted between the operator and the lever for over-center movement relative to the operator in response to movement of the lever. Means are carried by the lever to forcibly move the operator in response to actuation of the pushbuttons in the event the opeator is not moved in response to movement of the over-center spring. Actuation of the pushbuttons is effective respectively to move the contact carrier to contact closed and contact open positions for starting and stopping an associated motor.

In accord with a further aspect of the invention two types of three button switches having different functional requirements are provided each of which consists essentially of two sets of the basic housing section, contact block and operating mechanism modules employed in the two button switch and incorporating additionally a third pushbutton and a third lever section interconnecting the two levers of the two operating mechanisms. In one form a three button reversing switch is provided including a "stop" button and two direction control buttons. The "stop" button movably supports the third lever section and the ends of this lever section are connected by pin and slot connections to one end of each of the other two levers which have their other ends connected to the direction control buttons by pin and slot connections. The third lever section and the other two levers cooperate with fixed stop means to provide a lock which prevents actuation of either of the direction control buttons to an extent sufficient to close the associated contacts while the other of such buttons is in an actuated position thus requiring the "stop" button to be actuated before the motor direction can be changed.

The invention also provides a three button speed control switch which is identical in every respect to the previously described three button reversing switch except for the configuration of the third lever section. In the three button speed control switch the third lever section is configured so that the previously described lock is not provided since such is not necessary in the speed control switch. The third lever section is configured to permit random actuation of the three buttons and also serves to prevent both of the speed control buttons from being in an actuated position simultaneously.

Other objects and advantages of the invention will become apparent from the following description taken in conjunction with the accompanying drawing in which.

Figure 1:
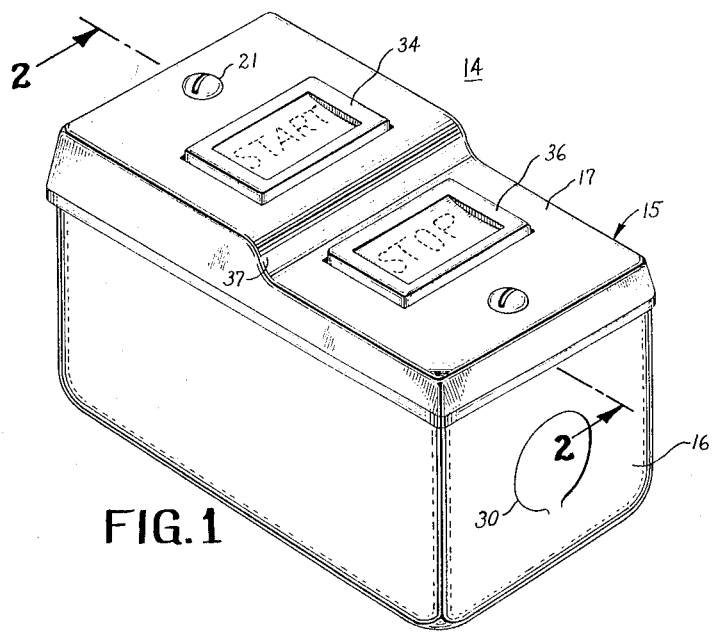
FIGURE 1 is a view in perspective illustrating a two pushbutton switch constructed in accord with the invention.

Referring now to the drawing there is illustrated in FIGURE 1 a two button electric switch represented generally by the numeral 14 and incorporating the present invention. The switch 14 is particularly suited for the control of electric motors and includes a housing 15 of two part construction including a case 16 preferably formed of a suitable metal having an open top and an enlarged cavity. A cover 17 preferably formed of metal overlies the open top of the case 16 and the case 16 includes a pair of inwardly turned end flanges 18 which support the cover 17 and a metal mounting plate 19. The cover 17 and the mounting plate 19 are secured together as by riveting and are detachably mounted to the case 16 by suitable fasteners such as screws 21 which pass through aligned openings formed in the end flanges 18, the mounting plate 19 and the cover 17.

Figure 2:
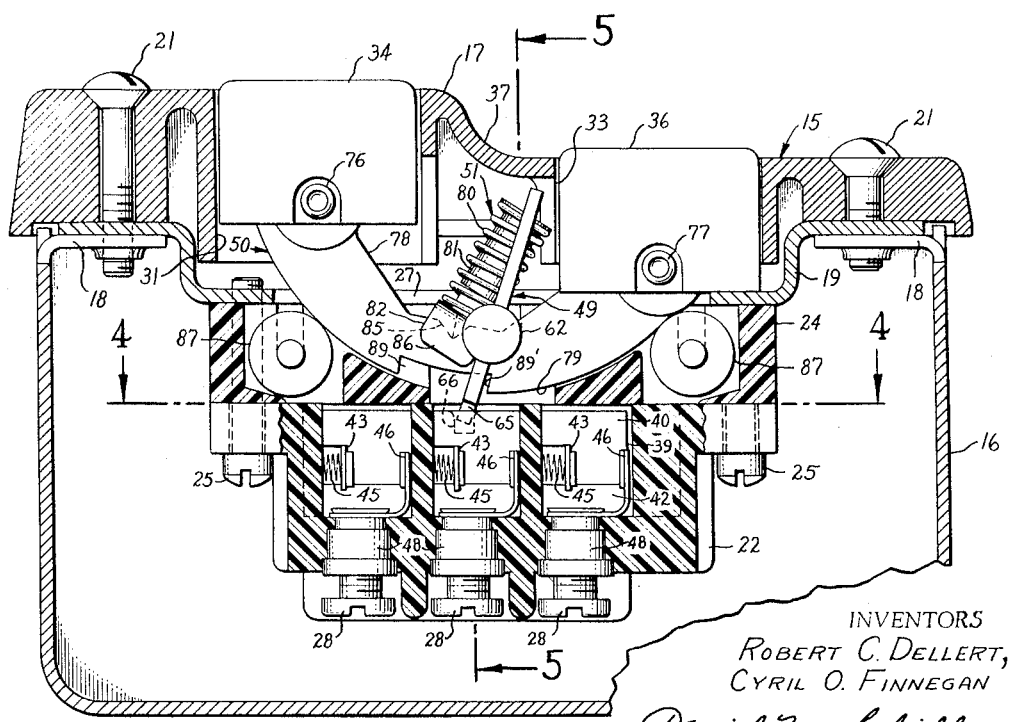
FIGURE 2 is a view taken along the line 2—2 of FIGURE 1 with parts shown in section.

The switch 14 includes a contact block 22 best shown in FIGURE 2 within the case 16 and which houses the fixed and movable contacts of the switch. The block 22 is preferably formed of an insulating material and abuts the lower end of an upper housing section 24 also located within the case 16 with its upper surface engaging the underside of a central portion of the mounting plate 19. The contact block 22 and the housing section 24 are detachably secured to the plate 19 by suitable fasteners such as screws 25 which extend through aligned openings of the block 22, the housing section 24 and the mounting plate 19. The housing section 24 is preferably formed of insulating material and contains recesses which receive certain parts of the operating mechanism as will presently appear. The 19 includes a central opening 27 which communicates with the recesses of the housing section 24.

As shown in FIGURE 2, the contact block 22 carries a plurality of terminal screws 28 to which electric conductors (not shown) are connected. The case 16 includes in its end walls knockouts 30 which when removed form openings through which the conductors connected to the screws 28 extend to a suitable load device controlled by the switch 14.

As best shown in FIGURE 2, the cover 17 includes a pair of spaced openings 31 and 33 which receive and serve to guide respectively a pair of pushbuttons 34 and 36 permitting manual actuation of the switch. The switch is shown in FIGURES 1 and 2 in its "off" condition and for this condition the upper surfaces of the pushbuttons 34 and 36 are substantially flush with the upper surface of the cover 17 but extend slightly outwardly of such surface. As shown in FIGURE 1, the switch 34 has the legend "start" applied thereto and when this button is actuated, the switch contacts are closed to start an associated motor. The button 36 has the legend "stop" applied thereto and when this button is actuated, the switch contacts are opened to stop the motor. When the switch is in its "off" condition, the button 36 is somewhat lower than the button 34 as viewed in FIGURE 2 and to permit a substantially flush mounting of the upper surfaces of the buttons with the upper surface of the cover 17, the cover is formed with a curved sloped section 37 intermediate the buttons 34 and 36.

Figure 3:
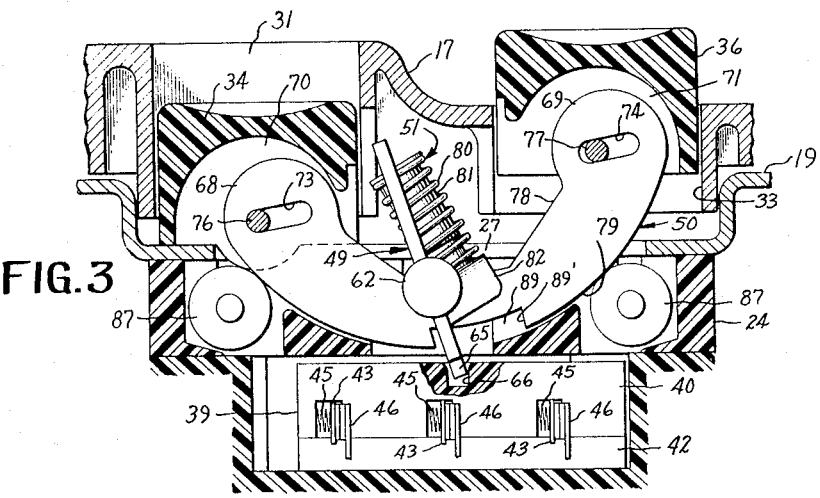
FIGURE 3 is a view similar to FIGURE 2 with parts removed and showing the "start" button in an actuated position to close the switch contacts.
Figure 4:
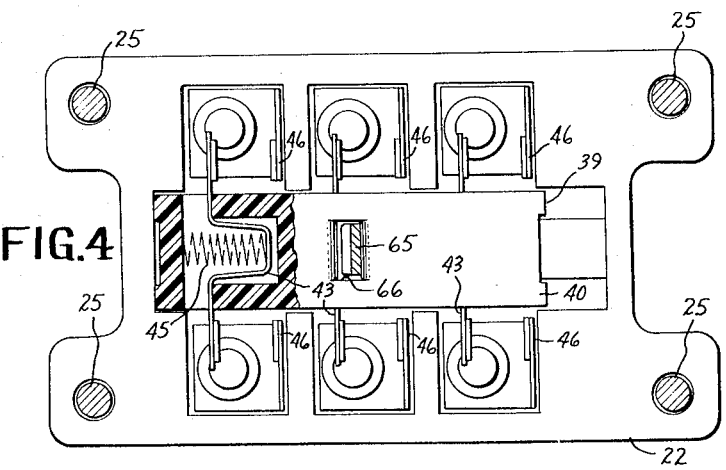
FIGURE 4 is a view taken along the line 4—4 of FIGURE 2 showing the movable contact carrier and the cooperating fixed contacts.

The movable contact assembly in the embodiment illustrated comprises an insulating contact carrier 39 which as best shown in FIGURE 3 comprises upper and lower sections 40 and 42 secured together in any suitable manner and trapping therebetween a plurality of longitudinally spaced movable contacts 43. Three movable contacts are shown and as best shown in FIGURE 4 each movable contact comprises a bridging contact having a U-shaped central section which connects a pair of laterally extending arms each of which projects outwardly of the carrier 39 and each of which carries at its end a contact tip. A plurality of bias springs 45, only one of which is shown in FIGURE 4, each is located between the base of the U-shaped section of the associated bridging contact and a section of the carrier to urge the contacts toward a plurality of associated fixed contacts 46 which are mounted in longitudinally spaced recesses formed in the block 22 at opposite sides of the carrier 39. The fixed contacts comprise tips which are mounted on electroconductive terminals secured in position by internally threaded electroconductive inserts 48 (FIG. 2) extending through openings in the lower wall of the block 22 and having ends turned over the fixed contact terminals. The screws 28 are threaded within the inserts 48.

The carrier 39 is mounted by the block 22 for reciprocating movement with respect to the block in opposite directions along an axis which is generally perpendicular to the axes of reciprocation of the pushbuttons 34 and 36. With the switch in its "off" condition, the carrier 39 is in its extreme lefthand position as viewed in FIGURES 2 and 4 and the bridging contacts 43 are spaced from their associated fixed contacts 46.

Figure 5:
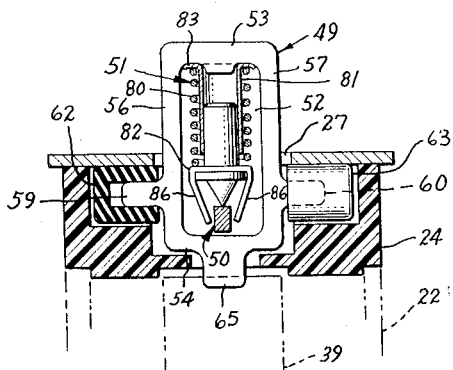
FIGURE 5 is a view taken along the line 5—5 of FIGURE 2 and showing the operator displaced in a counterclockwise direction from its position shown in FIGURE 2 to assume a vertical position for purpose of illustration.

In order to effect reciprocation of the carrier 39 in response to actuation of the pushbuttons 34 and 36, the present invention provides an improved operating mechanism operatively connected between the carrier 39 and the pushbuttons. The operating mechanism includes an operator 49 connected to the carrier 39, a lever 50 connected to the pushbuttons, and over-center resilient means 51 connected between the operator 49 and the lever 50. The configuration and mounting of the operator 49 are best shown in FIGURE 5 which illustrates the operator in a vertical position which is not a stable position of the operator but which is shown for purposes of illustration. As shown in FIGURE 5 the operator 49 is in the form of a plate having a central opening 52 defining a pair of vertically spaced end walls 53 and 54 and a pair of horizontally spaced side walls 56 and 57 connecting the end walls. The operator is preferably mounted for pivotal movement relative to the housing 15 and for this purpose includes a pair of lateral projections 59 and 60 extending from the side walls 56 and 57 with a press fit into openings formed in a pair of suitable bearings 62 and 63 which are freely rotatable within recesses formed in the housing section 24 and which have open tops closed by the plate 19. The portion of the operator above the projections 59 and 60 extends through the opening 27 in the plate 19 and is located above such plate within a recess formed in the cover 17.

The operator 49 is connected to the carrier 39 to effect reciprocation thereof and in the illustrated embodiment of the invention this connection comprises a projection 65 extending from the end wall 54 of the operator through an opening in the bottom of the housing section 24 into releasable engagement with a slot 66 formed in the upper surface of the section 40 of the carrier 39. The operator 49 is mounted for pivotal movement about the axis of the bearings 62 and 63 which axis is seen to extend perpendicular to the axis of reciprocation of the carrier 39.

To effect pivotal movement of the operator 49 in response to actuation of the pushbuttons the lever 50 is provided and is generally in the form of a flat plate having a generally curved configuration as best shown in FIGURES 2 and 3. The lever includes a pair of end sections 68 and 69 and extends with clearance through the opening 52 of the operator for movement with respect thereto in opposite directions by translatory motion along a curved path transverse to the axis of pivotal movement of the operator. The end sections 68 and 69 of the lever are located above the plate 19 and are connected respectively to the pushbuttons 34 and 36 and to permit the combined vertical and transverse movement of the lever ends, these connections are preferably pin and slot connections. As shown in FIGURE 3, recesses 70 and 71 are formed in the pushbuttons to receive the end sections of the lever which contain slots 73 and 74 through which extend rivet pins 76 and 77 which also project through openings in side walls of the pushbuttons. The lever 50 includes an upper edge 78 as viewed in FIGURE 2 and a curved lower edge 79.

In order to effect pivotal movement of the operator in response to transverse movement of the lever the over-center resilient means 51 is provided and has the construction best seen in FIGURE 5. As there shown, the resilient means 51 includes a coil spring 80 surrounding a hollow tube 81 with ends of the spring engaging respectively a base of a retainer 82 and a shoulder 83 of the tube 81 which shoulder bears against the underside of the end wall 53 of the operator. A pivot 84 extends loosely into the tube 81 and includes a shoulder which underlies the base of the retainer 82, the pivot 84 extending through an opening formed in the retainer base. The point of the pivot 84 engages a notch 85 as shown in FIGURE 2 formed in the edge 78 of the lever. The retainer 82 includes spaced depending legs 86 which extend downwardly across the side faces of the lever. The lever extends through the opening 27 of the plate 19 into the housing section 24 and is guided for movement by a pair of rollers 87 which are mounted for rotation within slots formed in the housing section 24 and opening at the upper surface thereof.

Operation of the switch just described is as follows. With pushbuttons 34 and 36 in their positions shown in FIGURE 2 the movable contacts are spaced from the fixed contacts and the components of the operating mechanism have the positions illustrated. In order to close the contacts and start the motor connected thereto the button 34 is depressed downwardly as viewed in FIGURE 2 to the position shown in FIGURE 3. This effects transverse movement of the lever 50 towards the right as viewed in FIGURE 2 and such movement of the lever carries the point of the pivot 84 towards the right. When the pivot 84 and the spring 80 pass through the plane of the operator 49, the operator is suddenly pivoted in a counterclockwise direction about its axis of mounting so that the lower end of the operator is moved to the right to effect movement of the carrier 39 to the right to close the fixed and movable contacts. Over-center movement of the spring 80 causes the lever 50 to continue its movement toward the right and elevate the pushbutton 36 to the position shown in FIGURE 3.

To open the switch contacts to stop the motor, the button 36 is depressed and the above-described sequence of events is reversed with the lever 50 moving towards the left as viewed in FIGURE 3 to move the spring 80 over-center which pivots the operator to move its lower end toward the left as viewed in FIGURE 3. This results in movement of the carrier 39 toward the left and opening of the fixed and movable contacts. The lever 50 effects elevation of the button 34 and the parts of the switch assume their positions shown in FIGURE 2.

When the contacts are closed, it is possible that they will become welded together with the weld being sufficiently strong such that depression of the button 36 and resultant overcenter movement of the spring 80 will fail to pivot the operator and move the carrier 39. In accord with the present invention means are provided to forcibly pivot the operator and move the carrier 39 to open the contacts in the event the contacts have become welded together. To this end the lever 50 carries means effective to strike the operator 49 to forcibly pivot it and displace the carrier 39 toward the left as viewed in FIGURE 3 in response to depression of the button 36. In the embodiment illustrated a generally rectangular notch 89 is formed in the lower edge 79 of the lever 50 with the notch 89 including a side wall 89'. In the event the contacts are welded and thus prevent pivoting of the operator 49 in response to depression of button 36, the lever 50 is nonetheless moved towards the left and carries with it the wall 89' which strikes the end wall 54 of the operator to forcibly move it and the carrier 39 toward the left to open the contacts.

Figure 6:
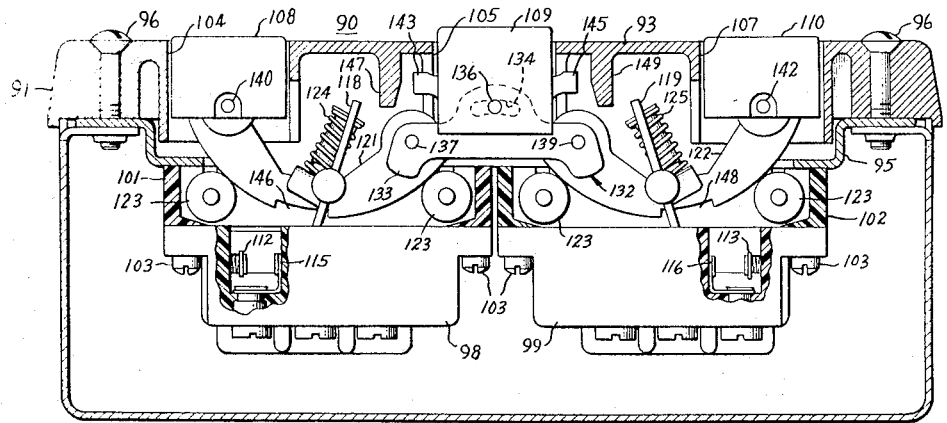
FIGURE 6 is a view in side elevation with parts shown in section illustrating an embodiment of the invention different from the embodiment of FIGURES 1–5 and in the form of a three button reversing switch.
Figure 7:
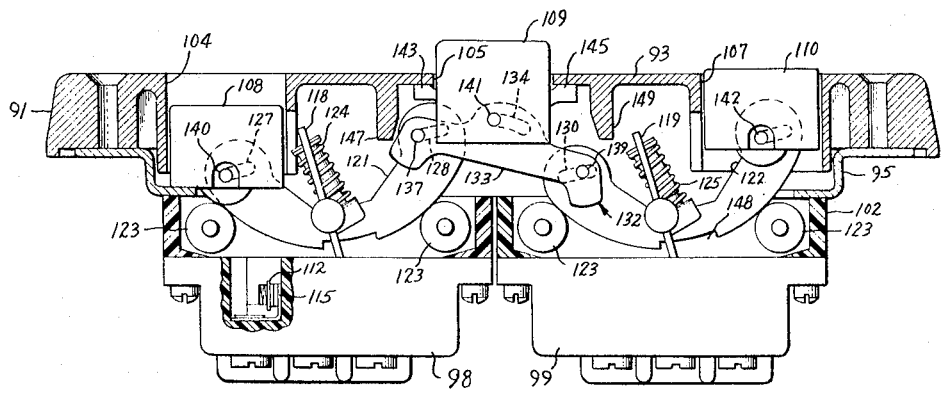
FIGURE 7 is a view similar to FIGURE 6 illustrating one of the direction control buttons in an actuated position to close its associated switch contacts.
Figure 8:
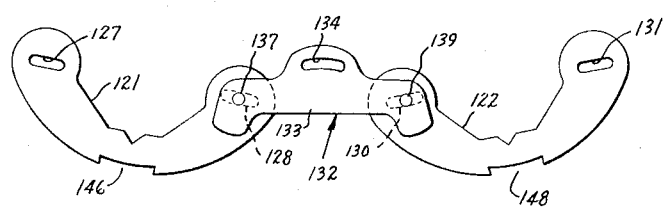
FIGURE 8 is a view in side elevation showing the three section lever assembly employed in the device illustrated in FIGURES 6 and 7.

Referring now to FIGURES 6–8 there is illustrated a different embodiment of the invention in the form of a three button switch employed as a motor reversing switch. The switch of FIGURE 6 is represented generally by the numeral 90 and is observed to consist of two sets of the contact block, housing section and operator mechanism modules of the switch 14 with the addition of a third pushbutton and a third or auxiliary lever section described hereinafter. To house the added parts the switch 90 includes a housing 91 which is more elongated than the housing 15 of the switch 14. The housing 91 includes a case 92 and a cover 93 secured to a mounting plate 95 with the cover and mounting plate detachably secured to the case by screws 96.

The switch 90 includes a pair of contact blocks 98 and 99 each identical to the contact block 22 of the switch 14. Also, a pair of housing sections 101 and 102 are located above the contact blocks and each of these housing sections is identical to the housing section 24 of the switch 14. The contact blocks 98 and 99 and the housing sections 101 and 102 are secured to the mounting plate by screws 103. The mounting plate 95 includes openings through which parts of the components of the operating mechanisms extend. The cover 93 includes three longitudinally spaced openings 104, 105 and 107 which receive respectively pushbuttons 108, 109 and 110 for effecting movement of the movable contacts 112 and 113 within the blocks 98 and 99 respectively. The movable contacts cooperate with fixed contacts 115 and 116 respectively within the contact blocks and the movable and fixed contacts have the identical configuration and mountings as described in connection with the switch 14.

As previously stated, the switch 90 includes a pair of operating mechanisms each identical to the mechanism of the switch 14, and these mechanisms include respectively operators 118 and 119 pivotally mounted and connected to the associated movable contact carrier and levers 121 and 122 guided by rollers 123 for transverse movement relative to the associated operators 118 and 119. A pair of over-center resilient means 124 and 125 are connected between the associated operators and levers for effecting pivotal movement of the operators in response to transverse movement of the associated levers. In order to connect the levers 121 and 122 to the pushbuttons 108 and 110 the lever 121 is provided in its end sections with slots 127 and 128, and in like manner the lever 122 is provided with slots 130 and 131 in its end sections.

In accord with the present invention a third lever section 132 is provided to interconnect the levers 121 and 122 and is movably connected to the pushbutton 109. In the embodiment illustrated in FIGURES 6-8 the third lever section 132 has a central slot 134 and a pair of holes in its end sections through which extend pins 137 and 139 which also pass through the slots 128 and 130 of the levers 121 and 122 to pivotally and slidably interconnect these levers. The buttons 108, 109 and 110 include recesses in which are positioned respectively the left hand end section of the lever 121, the central section of the lever section 132 and the right hand end section of the lever 122. Suitable rivet pins 140, 141 and 142 extend respectively through walls of the button 108 and the slot 127, walls of the button 109 and the slot 134, and walls of the button 110 and the slot 131 to pivotally and slidably connect the levers to the buttons. The described pin and slot connections permit both pivotal and sliding movement of the levers with respect to the pushbuttons and also pivotal and sliding movement of the levers with respect to one another. The third lever section 132 preferably comprises two levers 133, only one of which is shown, of identical configuration each positioned on a separate side of the common plane formed by the levers 121 and 122 with the two levers 133 being connected together by the pins 137 and 139 for movement as a unit. The central button 109 includes a pair of laterally extending projections 143 and 145 for a purpose described hereinafter.

In the embodiment of FIGURES 6-8 a reversing switch is illustrated for reversing the direction of rotation of a motor. For this purpose the button 108 is depressed to effect rotation of the motor in one direction to effect for example forward movement of controlled apparatus, and the button 110 is depressed to effect rotation of the motor in the opposite direction to effect reverse movement of the controlled apparatus. Accordingly, the button 108 may be labeled "forward" and the button 110 may be labeled "reverse." The intermediate button 109 when actuated is effective to stop the motor and thus may be labeled "stop." Operation of the reversing switch 90 will now be described.

With the parts of the switch 90 in the positions illustrated in FIGURE 6, the two sets of fixed and movable contact means are each in open condition and the associated motor is accordingly deenergized. If it is desired to energize the motor for rotation in a direction to cause forward movement of associated apparatus, the button 108 is depressed which results in movement of the lever 121, the over-center spring 124 and the operator 118 to their positions illustrated in FIGURE 7. As previously described in connection with the switch 14, such movement of the parts of the operating mechanism is effective to close the associated fixed and movable contacts to thus energize the motor. It is noted that movement of the lever 121 towards the right as viewed in FIGURE 6 results in its righthand end section engaging the projection 143 on the button 109 to elevate the button 109 outwardly of the housing. Also, such movement of lever 121 effects combined pivotal and sliding movement of the lever section 132 so that it assumes the position illustrated in FIGURE 7 when the contacts 112 and 115 are closed. Such movement of the lever section 132 does not cause movement of the lever 122 and the pin 139 is displaced slightly toward the right in the slot 130 from its normal position shown in FIGURE 8.

If it is now desired to stop the motor, the "stop" button 109 is depressed from its elevated position shown in FIGURE 7 which effects combined downward, piovtal and sliding movement of the lever section 132 to cause transverse movement of the lever 121 toward the left as viewed in FIGURE 7 which effects opening of the contacts 112 and 115. Movement of the lever 121 toward the left effects elevation of the button 108 outwardly of the housing, and after depression of button 109, the parts of the switch assume their normal positions shown in FIGURE 6. Depression of button 109 does not cause movement of the lever 122 which remains in its position shown in FIGURES 6 and 7.

Assuming that the parts of the switch are in their position shown in FIGURE 6, if it is desired to energize the motor for rotation in the opposite direction to cause reverse movement of associated apparatus, the button 110 is depressed which results in movement of the lever 122 toward the left as viewed in FIGURE 6 to effect closure of the contacts 113 and 116. Such movement of the lever 122 results in its lefthand end section engaging the projection 145 on the button 109 to elevate the button 109 outwardly of the housing, and also effects combined pivotal and sliding movement of the lever section 132 without effecting movement of the lever 121. Such depression of the button 110 will result in the parts of the switch assuming positions which are mirror images of the positions of such parts shown in FIGURE 7. In order to stop the reverse rotation of the motor the "stop" button 109 is depressed which effects movement of the lever 122 back to its position shown in FIGURE 6 and opening of the contacts 113 and 116.

In three button reversing switches it is necessary that provision be made to prevent actuation of one of the direction control buttons and closure of its associated contacts while the other direction control button is in actuated position and its associated contacts are closed. Such provision properly requires that the "stop" button be depressed prior to depression of either of the direction control buttons for changing the direction of rotation of the motor. In accord with the present invention novel and improved means is provided which strongly resists depression of either of the buttons 108 or 110 to an extent sufficient to close its associated contacts while the other of such buttons is in depressed position. In the preferred embodiment of the invention such means comprises the lever assembly which is configured and arranged such that the levers 121 and 122 cannot be moved appreciably in the event normal actuating force is applied to one of the buttons 108 and 110 while the other of such buttons is already in depressed position.

To illustrate the operation let it be assumed that the button 108 has been depressed and that the switch parts are in their positions illustrated in FIGURE 7. For such depressed position of the button 108 the lever section 132 assumes the position shown such that the pin 137 is at the extreme lefthand end of the slot 128 in the lever 121, and the pin 141 is at the extreme lefthand end of the slot 134. It is also noted that the pin 139 is only slightly spaced from the righthand end of the slot 130 in the lever 122. If an attempt is made to depress the button 110 with normally applied force, the lever 122 is shifted a short distance toward the left as viewed in FIGURE 7 until the righthand end of the slot 130 engages the pin 139. When this occurs, further displacement of the lever 122 toward the left is strongly resisted by the spring 124 which urges the lefthand end of the slot 128 against the pin 137 to thus resist sliding movement of the lever section 132. The arrangement described strongly resists movement of the lever 122 by an amount sufficient to cause over-center movement of the associated spring 125 in response to normal force applied to button 110. The resistance so presented to attempted depression of the button 110 will ordinarily remind an operator that he is to first depress the "stop" button 109 prior to depressing the button 110. However, in the event that he is not so reminded and proceeds to apply an unusually large force to the button 110, the levers 122 and 132 may thereby be shifted to the left and the righthand end of lever 121 pivoted away from the associated roller 123 about the pin 140 in a counterclockwise direction against the bias of spring 124 by an amount sufficient to carry the spring 125 over-center to close the contacts 113 and 116 while the contacts 112 and 115 are closed.

To positively prevent forcible depression of either of the direction control buttons and closure of the associated contacts while the other button is depressed and its contacts are closed, the invention provides fixed stop means which engage and prevent substantial movement of the lever assembly in response to a forcible attempt to depress either of the buttons 108 and 110. In the illustrated embodiment of the invention the stop means comprises a pair of lugs 147 and 149 depending from the top wall of the cover 93 adjacent respectively the righthand end section of lever 121 and the lefthand end section of the lever 122. With the switch parts in their positions shown in FIGURE 7 it is observed that the lug 147 is positioned to engage the righthand end section of lever 121 after a very small amount of pivotal movement thereof in response to a forcible attempt to depress button 110 to thus prevent shifting of the lever 122 to the extent necessary to close contacts 113 and 116. It is thus seen that a very effective lock is provided which requires that the "stop" button 109 be depressed subsequent to depression of one of the buttons 108 and 110 and prior to depression of the other of such buttons.

The levers 121 and 122 include the notches 146 and 148 respectively in their lower edges as viewed in FIGURE 6. These notches serve the same function as the notch 89 in the lever 50 of the switch 14 and serve to forcibly open the closed contacts if such have become welded.

Figure 9:
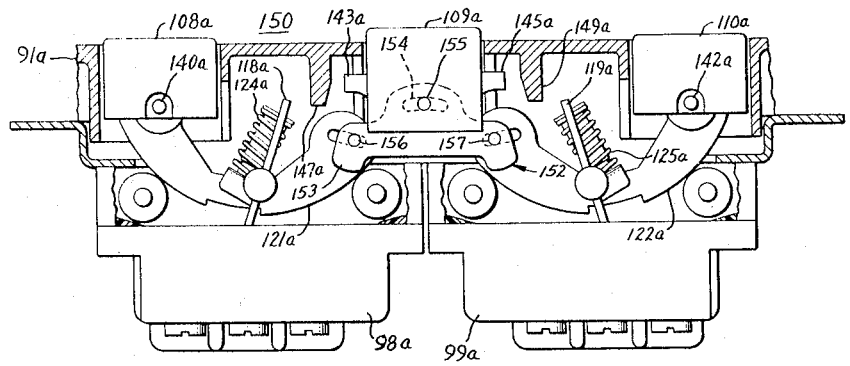
FIGURE 9 is a view in side elevation with parts shown in section illustrating an embodiment of the invention different than the embodiments shown in FIGURES 1–8 and in the form of a three button speed control switch.
Figure 10:
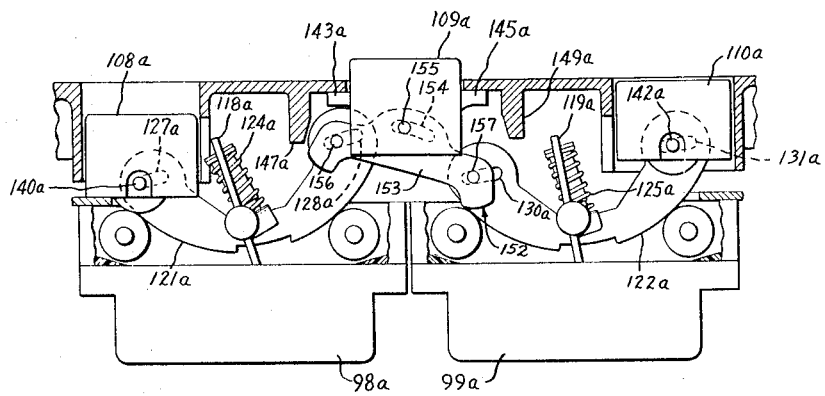
FIGURE 10 is a view similar to FIGURE 9 showing one of the speed control buttons in an actuated position to close its associated switch contacts.
Figure 11:
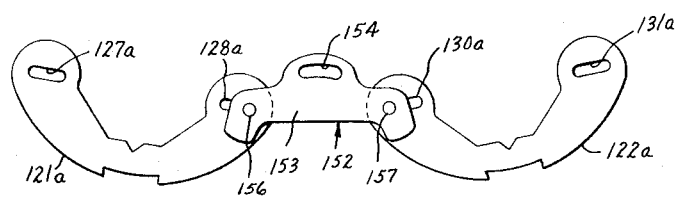
FIGURE 11 is a view in side elevation showing the three section lever assembly employed in the device shown in FIGURES 9 and 10.

Referring now to FIGURES 9–11 there is illustrated a further embodiment of the invention in the form of a three button switch employed as a motor speed control switch. The switch of FIGURES 9–11 is represented generally by the numeral 150 and is identical to the switch 90 of FIGURES 6–8 with the exception of the configuration and arrangement of the third lever section which connects the two levers of the two operating mechanism modules. Components of the switch 150 of FIGURES 9–11 which are identical to corresponding components of the switch 90 of FIGURES 6–8 are represented by the same reference numerals employed for the corresponding components of the switch 90 with the suffix "a" added.

In three button motor speed control switches it is not necessary to provide lock means for preventing actuation of one of the speed control buttons while the other speed control button is in a depressed position. However, provision should be made for preventing both of the speed control buttons from being in a depressed position simultaneously. In the switch 150 three buttons 108a, 109a, 110a are provided and may be labeled respectively "fast," "stop," and "slow." The operating mechanism modules and also the housing section and contact block modules of the switch 150 are identical to the corresponding modules of the switch 90 of FIGURES 6–8.

In accord with the invention illustrated in FIGURES 9–11 a third lever section 152 is provided to interconnect the levers 121a and 122a and is connected to the pushbutton 109a to permit random operation of the various pushbuttons in any desired sequence and to prevent the two speed control buttons 108a and 110a from being in depressed positions simultaneously. In the embodiment illustrated in FIGURES 9–11 the lever section 152 contains two holes one in each of its end sections and a slot 154 in its central section through which extend pins 155, 156 and 157, the pins 156 and 157 extending through slots 128a and 130a of the levers 121a and 122a to pivotally and slidably interconnect these levers. The pin 155 extends through walls of the button 109a to pivotally and slidably connect the lever section 152 to the button 109a. It is noted that the lever section 152 has a length dimension which is less than the length dimension of the lever section 132. The lever section 152 preferably comprises two levers 153, only one of which is shown, of identical configuration each positioned on a separate side of the common plane formed by the levers 121a and 122a with the two levers 153 connected together by the pins 155, 156 and 157 for movement as a unit. Operation of the speed control switch 150 will now be described.

With the parts of the switch 150 in the positions illustrated in FIGURE 9, the two sets of fixed and movable contact means are each in open condition and the associated motor is accordingly deenergized. If it is desired to energize the motor for rotation at a fast speed, the button 108a is depressed which results in movement of the parts of the associated operating mechanism to the positions illustrated in FIGURE 10 and closing of the associated fixed and movable contacts. Resulting movement of the lever 121a towards the right as viewed in FIGURE 9 effects elevation of the button 109a by engagement of the projection 143a and also effects pivotal movement of the lever section 152 in a clockwise direction about the pin 155 and a slight shifting of the lever section 152 toward the right. Such movement of the lever section 152 results in slight displacement of the lever 122a toward the left as viewed in FIGURE 9 but such displacement is not sufficient to effect closure of the associated contacts.

If it is now described to stop the motor, the "stop" button 109a is depressed from its position shown in FIGURE 10 which effects combined downward and pivotal movement of the lever section 152 to cause transverse movement of the lever 121a toward the left as viewed in FIGURE 10. Such movement of the lever 121a effects elevation of the button 108a to its position shown in FIGURE 9 and also results in opening of the associated fixed and movable contacts. All parts of the switch 150 thereby assume their positions shown in FIGURE 9.

Assuming that the parts of the switch 150 are in their positions shown in FIGURE 9, if it is desired to energize the motor for rotation at a slow speed, the button 110a is depressed which results in elevation of the button 109a and operation of the operating mechanism associated with the button 110a to close the associated contacts. Such depression of the button 110a results in the parts of the switch assuming positions which are mirror images of the positions of such parts shown in FIGURE 10. To stop the slow speed rotation of the motor the button 109a is depressed which results in opening of the contacts associated with the button 110a and return of the switch parts to their positions shown in FIGURE 9.

As previously stated, the lever assembly including the levers 121a and 122a and also the lever section 152 permits random operation of the buttons 108a, 109a and 110a and also prevents the buttons 108a and 110a from being in depressed positions simultaneously. To illustrate the operation of the lever assembly let it be assumed that the button 108a has been depressed and that the switch parts are in their positions shown in FIGURE 10. If it is now desired to change the speed of the motor from "fast" to "slow," this can be done by depressing the button 110 with normal force without first depressing the "stop" button 109a. Depression of button 110a moves the lever 122a toward the left as viewed in FIGURE 10 which causes counterclockwise pivotal movement of lever section 152 about the pin 155 and a slight shift of the lever section 152 toward the left which results in movement of the lever 121a toward the left as viewed in FIGURE 10 and elevation of the button 108a together with opening of the previously closed contacts associated with the button 108a. In a similar manner, if the button 110a is in a depressed position and the button 108a is depressed, the lever assembly will operate to close the contacts in the contact block 98a and to open the contacts in the contact block 99a. Thus, due to the shorter length of the lever section 152 than the lever section 13, the buttons 108a and 110a can be actuated in succession if desired. While lugs 147a and 149a are shown in FIGURES 9 and 10, these lugs are not necessary and may be omitted.

Although the invention has been described with reference to certain specific embodiments thereof numerous modifications are possible and it is desired to cover all modifications falling within the spirit and scope of the invention.

What we claim as new and desire to secure by Letters Patent of the United States is:

1. An electrical switch comprising in combination, a housing, a movable contact carrier supported within the housing for movement in opposite directions, movable contact means carried by said carrier, fixed contact means fixed within said housing for cooperation with said movable contact means, an operator mounted within said housing for pivotal movement in opposite directions about a first axis generally perpendicular to the directions of movement of said carrier, said operator being of hollow configuration having spaced end walls on opposite sides of said first axis, said operator being operatively connected to said carrier to move the carrier in response to such pivotal movement, a lever having a pair of end sections and movable relative to said operator in opposite directions along a path extending transversely of said first axis, said lever comprising a plate defining a plane generally perpendicular to said first axis and extending through said hollow operator, said lever also having an edge spaced from one of said end walls of said operator, over-center resilient means positioned between said edge of said lever and said one of said end walls of said operator for over-center movement in opposite directions in response to movement of said lever to effect pivotal movement of said operator, a pair of actuatable pushbuttons guided by said housing for reciprocating movement along a pair of spaced parallel second axes extending generally perpendicular to said first axis, and means operatively connecting each end section of said lever to a separate one of said pushbuttons to effect movement of said lever in response to actuation of a selected pushbutton, one of said pushbuttons when actuated effecting movement of said lever in one direction to cause movement of said contact carrier in one direction for closing said fixed and movable contacts, said other pushbutton when actuated subsequent to actuation of said one pushbutton effecting movement of said lever in the opposite direction to cause movement of said contact carrier in the opposite direction for opening said fixed and movable contacts.

2. An electrical switch comprising in combination, a housing, a movable contact carrier supported within the housing for movement in opposite directions, movable contact means carried by said carrier, fixed contact means fixed within said housing for cooperation with said movable contact means, an operator mounted within said housing for pivotal movement in opposite directions about a first axis generally perpendicular to the directions of movement of said carrier, said operator being operatively connected to said carrier to move the carrier in response to such pivotal movement, a lever having a pair of end sections and movable relative to said operator in opposite directions along a path extending transversely of said first axis, over-center resilient means between said operator and said lever for over-center movement in opposite directions in response to movement of said lever to effect pivotal movement of said operator, a pair of actuatable pushbuttons guided by said housing for reciprocating movement along a pair of spaced parallel second axes extending generally perpendicular to said first axis, and means operatively connecting each end section of said lever to a separate one of said pushbuttons to effect movement of said lever in response to actuation of a selected pushbutton, one of said pushbuttons when actuated effecting movement of said lever in one direction to cause movement of said contact carrier in one direction for closing said fixed and movable contacts, said other pushbutton when actuated subsequent to actuation of said one pushbutton effecting movement of said lever in the opposite direction to cause movement of said contact carrier in the opposite direction for opening said fixed and movable contacts, said lever including a part which engages said operator to forcibly pivot the operator in response to actuation of said other pushbutton in the event said operator is not pivoted by movement of said resilient means.

3. An electric switch comprising in combination, a housing, a movable contact carrier supported within the housing for movement in opposite directions, movable contact means carried by said carrier, fixed contact means fixed within said housing for cooperation with said movable contact means, an operator mounted within said housing for movement in opposite directions, said operator being operatively connected to said carrier to effect movement thereof in response to movement of said operator, a lever having a pair of end sections and movable by translatory motion relative to said operator in opposite directions, over-center resilient means between said operator and said lever for over-center movement in opposite directions in response to translatory movement of said lever to effect movement of said operator, a pair of actuatable pushbuttons guided by said housing for reciprocating movement, means operatively connecting each end section of said lever to a separate one of said pushbuttons to effect translatory movement of said lever in response to actuation of a selected pushbutton, one of said pushbuttons when actuated effecting translatory movement of said lever in one direction to cause movement of said carrier in one direction for closing said fixed and movable contact means, said other pushbutton when actuated subsequent to actaution of said one pushbutton effecting translatory movement of said lever in the opposite direction to cause movement of said carrier in the opposite direction for opening said fixed and movable contact means normally spaced from said operator, and means carried by said lever and movable with said lever into engagement with said operator to forcibly move the operator in response to actuation of said other pushbutton in the event said operator is not moved by movement of said resilient means.

4. An electrical switch comprising in combination, a housing, a movable contact carrier supported within the housing for reciprocating movement along a first axis, movable contact means carried by said carrier, fixed contact means fixed within said housing for cooperation with said movable contact means, a hollow operator mounted within said housing for pivotal movement in opposite directions about a second axis generally perpendicular to said first axis, said operator having end walls on opposite sides of said second axis, means operatively connecting said carrier and said operator to effect reciprocation of said carrier in response to pivotal movement of said operator, a lever defining a plane generally perpendicular to said second axis and extending through said hollow operator between the end walls thereof, said lever having a pair of end sections and having opposed edges with one of said edges being curved about said second axis, said lever being movable in said plane through a curved path in opposite directions relative to said operator, an over-center spring between the other edge of said lever and the adjacent end wall of said operator for over-center movement in opposite directions in response to movement of said lever to effect pivotal movement of said operator, a pair of actuatable pushbuttons guided by said housing for reciprocating movement between depressed and elevated positions along spaced parallel third axes generally perpendicular to said first and second axes, and connection means operatively connecting each end section of said lever to a separate one of said pushbuttons to effect movement of said lever in response to actuation of a selected pushbutton, one of said pushbuttons when depressed inwardly of said housing effecting movement of said lever in one direction to elevate the other pushbutton outwardly of said housing and to move said carrier in one direction for closing said fixed and movable contact means, said other pushbutton when depressed inwardly of said housing subsequent to depression of said one pushbutton effecting movement of said lever in the opposite direction to elevate said one pushbutton outwardly of said housing and to move said carrier in the opposite direction for opening said fixed and movable contact means.

5. A switch as defined in claim 4 wherein said one edge of said lever includes a notch defining a wall which engages said operator to forcibly pivot the opeartor in response to actuation of said other pushbutton in the event said operator is not pivoted by movement of said over-center spring.

6. A switch as defined in claim 4 wherein said connection means comprises a pair of slots each in a separate end section of said lever, and a pair of pins each on a separate one of said pushbuttons extending through said slots.

7. An electrical switch comprising in combination, a housing, a movable contact carrier supported within the housing for reciprocating movement along a first axis, movable contact means carried by said carrier, fixed contact means fixed within said housing for cooperation with said movable contact means, a hollow operator mounted within said housing for pivotal movement in opposite direction about a second axis generally perpendicular to said first axis, said operator having end walls on opposite sides of said second axis, means operatively connecting said carrier and said operator to effect reciprocation of said carrier in response to pivotal movement of said operator, a lever defining a plane generally perpendicular to said second axis and extending through said hollow operator between the end walls thereof, said lever having a pair of end sections and having opposed edges with one of said edges being curved about said second axis, said lever being movable in its plane through a curved path in opposite directions relative to said operator, an over-center spring between the other edge of said lever and the adjacent end wall of said opeartor for over-center movement in opposite directions in response to movement of said lever to effect pivotal movement of said opeartor, a pair of actuatable pushbuttons guided by said housing for reciprocation along spaced parallel third axes extending generally perpendicular to said first and second axes and on opposite sides of said second axis, means operatively connecting each end section of said lever to a separate one of said pushbuttons to effect movement of said lever in response to actuation of a selected pushbutton, one of said pushbuttons when actuated effecting movement of said lever in one direction to effect movement of said carrier in one direction for closing said fixed and movable contact means, said other pushbutton when actuated subsequent to actuation of said one pushbutton effecting movement of said lever in the opposite direction to cause movement of said carrier in the opposite direction for opening said fixed and movable contact means, said one edge of said lever including a notch defining a shoulder which engages said operator to forcibly pivot the operator in response to actuatiton of said other pushbutton in the event the operator is not pivoted by movement of said over-center spring, and means guiding said lever for movement including a pair of rollers mounted within said housing for rotation about a pair of spaced fourth axes generally perpendicular to the plane of the lever and having peripheries engaging said one edge of said lever.

8. An electrical switch comprising in combination, a housing, first and second spaced movable contact carriers supported within said housing each for movement in opposite directions, first and second movable contact means carried respectively by said first and second carriers, first and second fixed contact means fixed within said housing for cooperation respectively with said first and second movable contact means, first and second spaced operators mounted within said housing each for movement in opposite directions, means operatively connecting said first and second operators respectively to said first and second carriers to move said first and second carriers, first, second, and third actuatable pushbuttons guided by said housing for reciprocating movement, and connection means connecting said pushbuttons to said operators for moving said operators in response to actuation of said pushbuttons, said connection means including first connections between said first and second pushbuttons and said first operator to effect movement of said first operator in one direction to close said first fixed and movable contact means in response to actuation of said first pushbutton, and to effect movement of said first operator in the opposite direction to open said first fixed and movable contact means in response to subsequent actuation of said second pushbutton, said connection means including also second connections between said second and third pushbuttons and said second operator to effect movement of said second operator in one direction to close said second fixed and movable contact means in response to actuation of said third pushbutton, and to effect movement of said second operator in the opposite direction to open said second fixed and movable contact means in response to subsequent actuation of said second pushbutton.

9. An electrical switch comprising in combination, a housing, first and second spaced movable contact carriers supported within the housing each for movement in opposite directions, first and second movable contact means carried respectively by said first and second carriers, first and second fixed contact means fixed within said housing for cooperation respectively with said first and second movable contact means, first and second spaced operators mounted within said housing each for movement in opposite directions, means operatively connecting said first and second operators respectively to said first and second carriers to move said first and second carriers, a lever assembly comprising first, second, and third levers, said first and second levers being associated respectively with said first and second operators and each being movable relative to its associated operator, first and second over-center resilient means respectively between the associated first operator and first lever and between the associated second operator and second lever, each of said resilient means being movable in response to movement of the associated lever to effect movement of the associated operator, first, second, and third pushbuttons each guided by said housing for reciprocating movement between depressed and elevated positions, each of said levers having a pair of end sections, and connection means connecting one end section of each of said first and second levers respectively to said first and second pushbuttons to permit relative movement therebetween, connecting the other end sections of each of said first and second levers to the end sections of said third lever to permit relative movement therebetween, and connecting said third lever to said third pushbutton to permit relative movement therebetween, said connection means effecting movement of said first lever in one direction in response to depression of said first pushbutton while said second pushbutton is in its elevated position to effect elevation of said third pushbutton and to cause movement of said first carrier in one direction to close the associated first fixed and movable contact means, said connection means also effecting movement of said second lever in one direction in response to depression of said second pushbutton while said first pushbutton is in its elevated position to effect elevation of said third pushbutton and to cause movement of said second carrier in one direction to close the associated second fixed and movable contact means, said connection means further being effective in response to depression of said third pushbutton subsequent to depression of either of said first and second pushbuttons to effect movement in the opposite direction of the one of said first and second levers connected to the previously depressed pushbutton to elevate the previously depressed pushbutton and to cause movement in the opposite direction of the associated carrier for opening the associated contact means.

10. A switch as defined in claim 9 wherein said third pushbutton is intermediate said first and second pushbuttons and said third lever is intermediate said first and second levers, said connection means comprising pin and slot connections which cooperate with said resilient means to resist substantial depression of either of said first and second pushbuttons while the other of said first and second pushbuttons is in depressed condition.

11. A switch as defined in claim 9 wherein said third pushbutton is intermediate said first and second pushbuttons and said third lever is intermediate said first and second levers, said connection means comprising pin and slot connections effective in response to depression of either of said first and second pushbuttons while the other of said first and second pushbuttons is in depressed condition to move all of said levers for elevating the previously depressed pushbutton and opening its associated fixed and movable contact means and for closing the fixed and movable contact means associated with the substantially depressed pushbutton.

12. A switch as defined in claim 9 wherein said first and second operators are mounted for pivotal movement about spaced parallel first axes perpendicular to the directions of movement of said first and second carriers, said first and second levers residing in a common plane perpendicular to said first axes and being movable in said plane transversely of said first axes, said third pushbutton being intermediate said first and second pushbuttons with said third lever being intermediate said first and second levers.

13. A switch as defined in claim 9 wherein said first and second operators are mounted for pivotal movement about spaced parallel first axes perpendicular to the directions of movement of said first and second carriers, said first and second levers residing in a common plane perpendicular to said first axes and being movable in said plane transversely of said first axes, said third pushbutton being intermediate said first and second pushbuttons with said third lever being intermediate said first and second levers, said connection means comprising pin and slot connections which cooperate with said resilient means to resist substantial depression of either of said first and second pushbuttons while the other of said first and second pushbuttons is in a depressed condition.

14. A switch as defined in claim 13 including stop means positioned to engage said first and second levers to positively prevent substantial depression of either of said first and second pushbuttons while the other of said first and second pushbuttons is in a depressed condition.

15. A switch as defined in claim 9 wherein said first and second operators are mounted for pivotal movement about spaced parallel first axes perpendicular to the directions of movement of said first and second carriers, said first and second levers residing in a common plane perpendicular to said first axes and being movable in said plane transversely of said first axes, said third pushbutton being intermediate said first and second pushbuttons with said third lever being intermediate said first and second levers, said connection means comprising pin and slot connections effective in response to depression of either of said first and second pushbuttons while the other of said first and second pushbuttons is in depressed position to move all of said levers for elevating the previously depressed pushbutton and opening its associated fixed and movable contact means and for closing the fixed and movable contact means associated with the subsequently depressed pushbutton.

References Cited by the Examiner
UNITED STATES PATENTS

| | | | |
|---|---|---|---|
| 1,466,267 | 8/1923 | Bentley | 200—72 |
| 2,117,782 | 5/1938 | Aldinger | 200—67 X |
| 2,277,555 | 3/1942 | Meuer | 200—5 |
| 2,773,150 | 12/1956 | Wintle | 200—116 |

ROBERT K. SCHAEFER, *Primary Examiner.*

J. R. SCOTT, *Assistant Examiner.*